April 19, 1927.  W. T. GODDARD  1,625,601

INSULATOR

Filed Oct. 1, 1921

INVENTOR.
Walter T. Goddard
BY
his ATTORNEY

Patented Apr. 19, 1927.

1,625,601

UNITED STATES PATENT OFFICE.

WALTER T. GODDARD, OF HAMILTON, ONTARIO, CANADA, ASSIGNOR TO LOCKE INSULATOR CORPORATION, OF BALTIMORE, MARYLAND, A CORPORATION OF MARYLAND.

INSULATOR.

Application filed October 1, 1921. Serial No. 504,666.

The invention relates to insulators, and more particularly to improvements in high tension insulators of the suspension type.

The principal object of my invention, generally considered, is to provide an insulator of the suspension type comprising a plurality of similar sections having great tensile strength detachably connected together, the said insulator being suitable for use with high tension transmission lines.

Another object of my invention is to provide an insulator comprising a plurality of sections which may be shipped as separate units and assembled at the point of erection. In the erection of transmission lines and in the replacement of broken insulators in rough country, where the insulators are often carried by mules or horses, it is of great advantage to provide an insulator of separable units.

With these and other objects in view the invention will be further and more fully set forth in the accompanying specification and drawings, the novel features thereof being pointed out in the claims.

In the drawings wherein I have illustrated a single embodiment of the invention,—

Throughout the specification and drawings like parts are designated by like reference characters.

Figure 1:
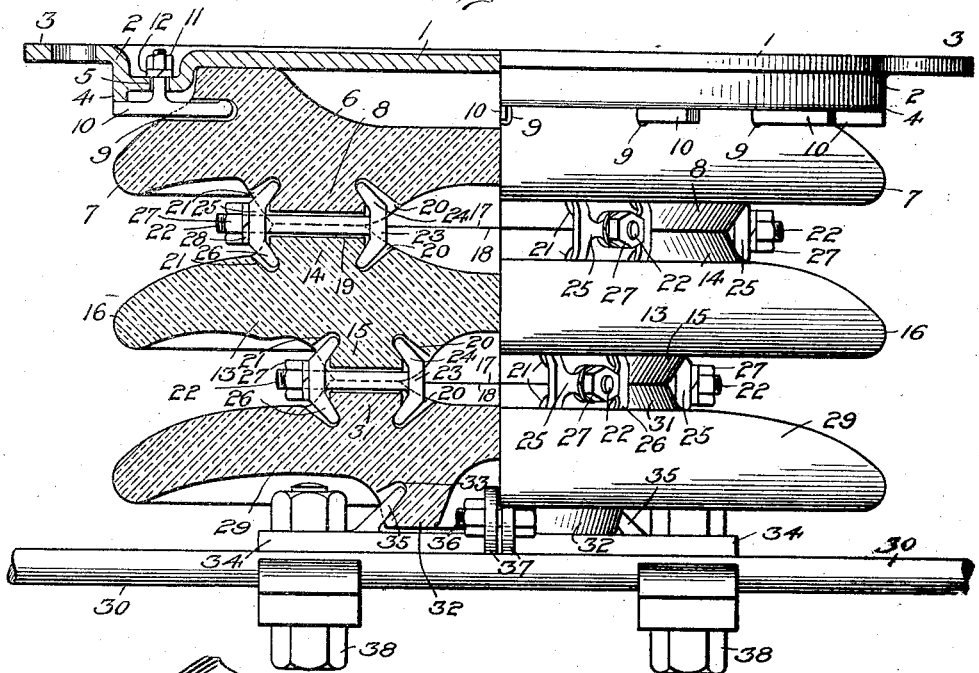
Figure 1 is a side elevation, partly in vertical section, of an insulator constructed in accordance with my invention.
Figure 2:
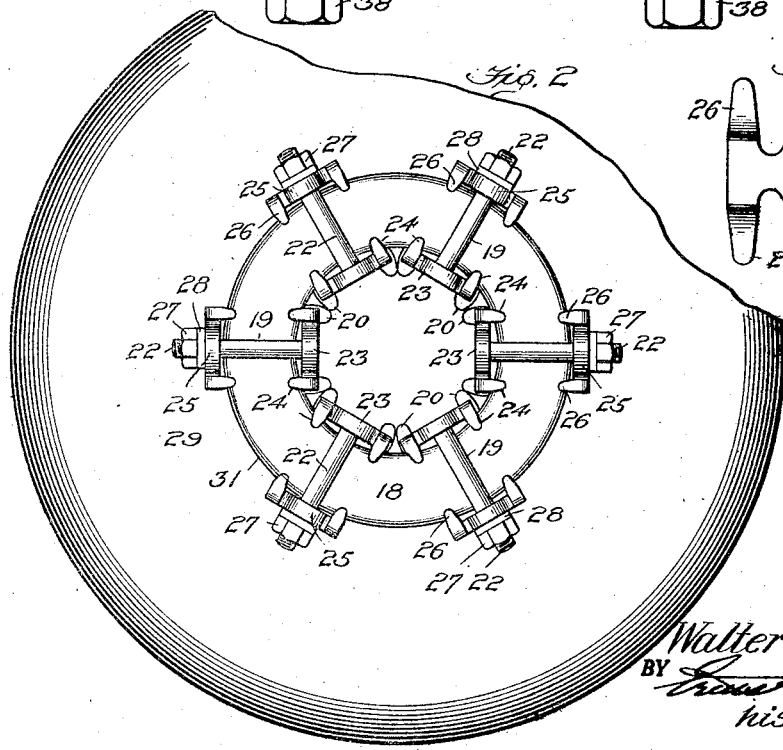
Figure 2 is a view in plan showing a single section with the securing clamps assembled therewith.
Figure 3:
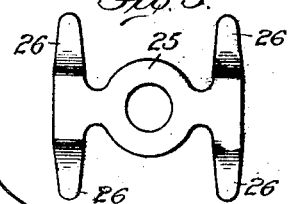
Figure 3 is a plan view of a part of the securing clamp.

The insulator preferably comprises a metallic disk 1 having formed thereon a projecting hub or band 2 which may be provided with a plurality of ears 3 in order to afford means for readily attaching the disk to a support. At the outer circumference of the hub 2, I provide a flange 4 and at an intermediate portion of the hub there is provided a plurality of openings 5 the purpose of which will hereinafter be pointed out.

Seated on the disk 1 within the hub 2 is the insulating member 6 of suitable material, such as porcelain or the like. The said porcelain disk is furnished with an outwardly projecting skirt portion 7 and a hub portion 8. At spaced points in the outer face of the skirt 7, I provide a series of radial holes 9 which may be formed in any suitable manner. The disk 6 is secured to the plate 1 by a plurality of T-bolts 10 equal in number to the openings 9. In the particular embodiment of the invention here illustrated one branch of each T engages in one of the openings 9 and the other branch of the T engages the flange 4 formed on the hub section 2, while the stem of each T-bolt projects through the openings 5 in the hub 2 and is maintained in position preferably by means of a nut 11 which is threadedly received upon the threaded portion of the stem of each bolt. If desired a lock washer 12 may be interposed between each nut and the adjacent face of the hub 2.

It will be observed that the portion of the T-bolt 10 which engages in the opening 9 of the insulating section is of less diameter than the opening 9, and likewise the shank or stem of the bolt is of less diameter than the opening 5 in the hub 2. The coacting portion of the insulator which fits within the hub 2 is also slightly less in diameter than the diameter of the hub, as will also be observed from an inspection of Fig. 1. By providing these various clearances I permit the free expansion and contraction of the porcelain or the plate 1 under temperature changes without placing destructive or detrimental strains upon the porcelain.

Secured to the disk 6 is a coacting disk 13 of like insulating material. The said disk 13 is provided with annular hubs 14 and 15 projecting respectively on the opposite sides of the flange or skirt portion 16. The hub 14 of the disk 13 is of substantially the same diameter as the hub 8 of the disk 6, and these coacting hubs are provided, preferably, with flat engaging faces 17 and 18. Each of these hubs is also provided with a plurality of radial openings 19, a portion of the opening 19 being formed in each of the said hubs. On the inner face of each hub and on opposite sides of the opening 19 I provide a pair of openings 20 in each of the said hubs, the said openings being arranged at an angle to the vertical axis of the said disks; and likewise on the outer face of each hub and adjacent the said openings 19 are provided similar pairs of inclined openings 21 in each of the said hubs.

To connect the disks 6 and 13 I employ a bolt 22 having a head 23 formed with a plurality of wings or fingers 24. The said wings or fingers are preferably symmetrical with reference to the bolt and are adapted to fit within the openings 20 hereinbefore described. Slidably mounted on the outer end of each bolt is a washer 25 which is formed with a plurality of pairs of fingers 26, the said fingers being adapted to be received within the openings 21 formed on the outer faces of the said hubs 8 and 14, respectively. A nut 27 is threadedly received on the outer end of the bolt 19 and is adapted to maintain the fingers formed on the head and washer in close engagement with the respective openings in the said hub. If desired a lock washer 28 may be interposed between the nut 27 and the washer 25. It will be understood that while I have described but a single fastening device a plurality of these fastening devices are employed one fitting in each of the openings between the adjacent hub sections.

As illustrated in the drawings, a third section 29 is connected to the section 13. It will be understood, however, that the number of sections may be increased or decreased as desired in accordance with the voltage of the current passing through the transmission line 30. The section 29 is provided on one face with a hub 31 corresponding in diameter to the hub section 15 of the section 13, and these corresponding hubs 15 and 31 are connected by the same form of mechanism as hereinbefore described with reference to the hubs 8 and 14. On its opposite face the section 29 is provided with a circular hub section 32 and on the outer face of this section there is provided a plurality of angularly disposed openings 33.

To support the transmission line 30 I provide a two-part clamp 34, said clamp having upstanding fingers 35 which are adapted to engage in the openings 33, the parts of the clamp being connected by means of bolts 36 which pass through alined openings in ears 37 provided on each part of the clamp 34. The transmission line 30 is preferably bolted to the clamp on opposite sides of the hub 32 by means of bolts and nuts 38.

While I have shown the insulator in inverted position, it will be evident to those skilled in the art that the insulator may be used in an upright position or as a post insulator without departing in any detail from the scope of my invention.

I claim:—

1. An insulator comprising a plurality of superposed members each including a body of insulating material, the adjacent faces of the superposed members having annular hub portions the contacting faces of which are formed with radial recesses which mate to define cylindrical openings, the hub portions of the adjacent members being formed with oppositely inclined recesses at the inner and outer peripheries thereof, and securing means for the adjacent sections or members comprising bolts lying within the mating recesses and having heads provided with angularly disposed projections engaging within the inner inclined recesses, retaining elements on said bolts having angularly disposed projections engaging within the outer inclined recesses and means on said bolts for securing said retaining elements.

2. An insulator comprising a plurality of superposed members each including a body of insulating material, the adjacent faces of the superposed members having annular hub portions the contacting faces of which are formed with radial recesses which mate to define cylindrical openings, the hub portions of the adjacent members being formed with oppositely inclined recesses at the inner and outer peripheries thereof, securing means for the adjacent sections or members comprising bolts lying within the mating recesses and having heads provided with angularly disposed projections engaging within the inner inclined recesses, retaining elements on said bolts having angularly disposed projections engaging within the outer inclined recesses, and nuts on said bolts for holding said retaining elements and heads in clamping engagement with the hub portions of the adjacent members.

3. An insulator comprising a plurality of superposed members having contacting hub portions, the contacting surfaces being formed with mating recesses, radially extending bolts lying within said mating recesses and having heads provided with angularly disposed portions engaging within the hub portions, retaining elements on said bolts having angularly disposed portions engaging within the hub portions, and means on said bolts for holding said retaining elements in place.

4. Means for securing together a plurality of superposed insulator sections, comprising radially extending bolt members recessed into the contacting faces of the sections and having angularly disposed fingers at their inner ends anchored within the sections, retaining elements carried by said bolts anchored within the outer peripheries of the sections, and nuts on the outer ends of the bolts engaging said retaining elements.

5. Means for securing together a plurality of superposed insulator sections, comprising radially extending bolt members recessed into the contacting faces of the sections and having angularly disposed fingers at their inner ends anchored within the sections, retaining elements carried by said bolts anchored within the outer peripheries of the sections, and nuts on the outer ends of the bolts engaging said retaining elements, said bolts lying in planes at right angles to the longitudinal axis of the assembly.

6. A high tension insulator comprising a plurality of superposed sections each formed as a body of insulating material, the sections being provided interiorly with inclined recesses and being provided externally with oppositely inclined recesses, bolt members located between the adjacent sections and having fingers at their inner ends engaging within the first named recesses and carrying retaining elements at their outer ends having angularly disposed projections engaging within the second named series of recesses, and means on said bolts for securing said retaining elements.

7. In a high tension insulator, a metallic supporting section provided with an annular hub portion having a series of openings in the web of the hub, a disk-shaped section of insulating material provided with a series of radial openings engaging the supporting section within the annulus of the hub portion, and angular clamping members secured to the metallic member through the openings therein and having portions engaging within the openings in said insulating section to secure such sections together.

8. In a high tension insulator, a metallic supporting section provided with a hub portion having a series of openings in the web of the hub, a flange formed on the outer portion of the said hub, a disk-shaped section of insulating material, provided with a series of radial openings, engaging the supporting section within the annulus of the hub, T-shaped clamping members having the shanks thereof secured to the supporting section through the openings therein, and having one branch of the T engaging said flange on the hub portion and the other branch engaging one of the openings in the section of insulating material to secure the sections together.

In testimony whereof I affix my signature.

WALTER T. GODDARD.